April 22, 1969     G. P. FOWLER     3,440,405

COOKING VESSEL PROBE EJECTOR

Filed May 19, 1967     Sheet _1_ of 2

INVENTOR.
Glen P. Fowler
BY
ATTORNEY.

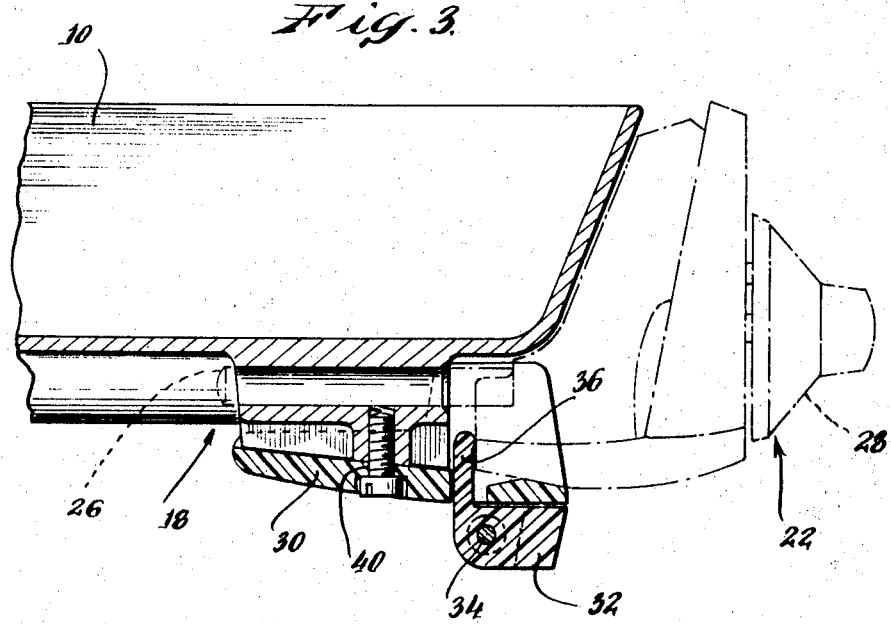
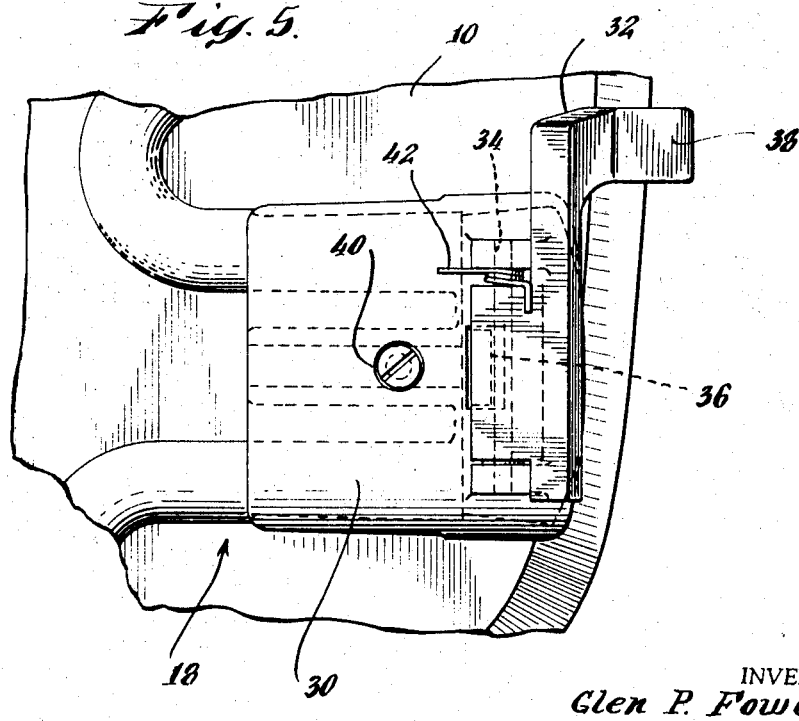

United States Patent Office 3,440,405
Patented Apr. 22, 1969

3,440,405
COOKING VESSEL PROBE EJECTOR
Glen P. Fowler, Fort Smith, Ark., assignor to General Electric Company, a corporation of New York
Filed May 19, 1967, Ser. No. 639,755
Int. Cl. F27d 11/00
U.S. Cl. 219—441                                   6 Claims

ABSTRACT OF THE DISCLOSURE

An ejector structure for use on cooking vessels, such as a skillet, for convenient removal of the control member from the cooking vessel.

BACKGROUND OF THE INVENTION

Field of the invention

The invention herein pertains to a cooking vessel probe ejector and, more particularly, to a novel ejector assembly for easy removal of the probe control member from the cooking vessel to which it is attached.

Description of the prior art

It has become common in the small appliance field to provide an electric appliance with a removable control member attached to an electric cord to avoid the need for individual controlling of each appliance. A removable probe thermostat that is usable with many similar appliances is provided as part of the control. This control member is a device that is attached to the cooking vessel in order to supply electric current for heating and also to support a temperature sensing probe to regulate the temperature of the vessel. The control member can be removed and used on other appliances having electrical terminals.

In the cases of large control members, a suitable hand grip may be provided so that the control may be pulled loose of the appliance. However, when the control member is placed on the appliance on the side away from the handles, it is difficult to remove because of lack of any grasping area on the vessel and the proximity to the hot cooking vessel. Additionally, the probe control is generally deliberately tight fitting due to the friction with the electrical terminals and the expansion of the terminal parts under elevated cooking temperature operation. It is known to use ejector structure to remove components from one another and commonly such ejectors have been proposed for removing male electrical plugs from standard wall sockets.

SUMMARY OF THE INVENTION

Briefly described, the present invention is directed to an electrical cooking appliance that is made up of a vessel with an attached heating element and projecting electrical terminals to supply electric current to the vessel. A removable control member which may have a temperature sensing probe thermostat is supplied and connected to the terminals. The terminals are protected by an enclosing shield member that surrounds the terminals on the vessel. Lever means are pivotally disposed on the shield member and the lever has an ejector on one end, the ejector being disposed between the control member and the vessel at the terminals. The lever also has a finger portion on the other end to form an ejector assembly for the control member. A downward force on the finger portion rotates the ejector to move the control member away from the vessel. The probe is preferably connected to the vessel between the electric terminals and the ejector may be a tab preferably disposed midway between the terminals to provide an even balanced horizontal force for moving the control member away from the vessel. The electric cord connected to the control member and the finger portion are disposed opposite one another on the shield member. The whole control, including the ejector assembly, is preferably disposed between the legs of and toward the center of gravity of the vessel whereby the force on the finger portion is transmitted through the legs to the supporting surface for the vessel. A spring means may be supplied to return the lever to an upright position after the control member has been ejected or moved away from the vessel. The probe thermostat is generally in the form of a long temperature sensing finger on the vessel or control so that the control is supported by the finger on the vessel after the control has been moved away from the vessel by the ejector assembly.

BRIEF DESCRIPTION OF THE DRAWING

FIG. 3 is a cross-sectional view on line 3—3 of FIG. 2 showing the vessel partly in section and control member in phantom and showing the ejector structure in the upright position;

FIG. 5 is a bottom plan view of the ejector assembly.

DESCRIPTION OF THE PREFERRED EMBODIMENT

Figure 1:
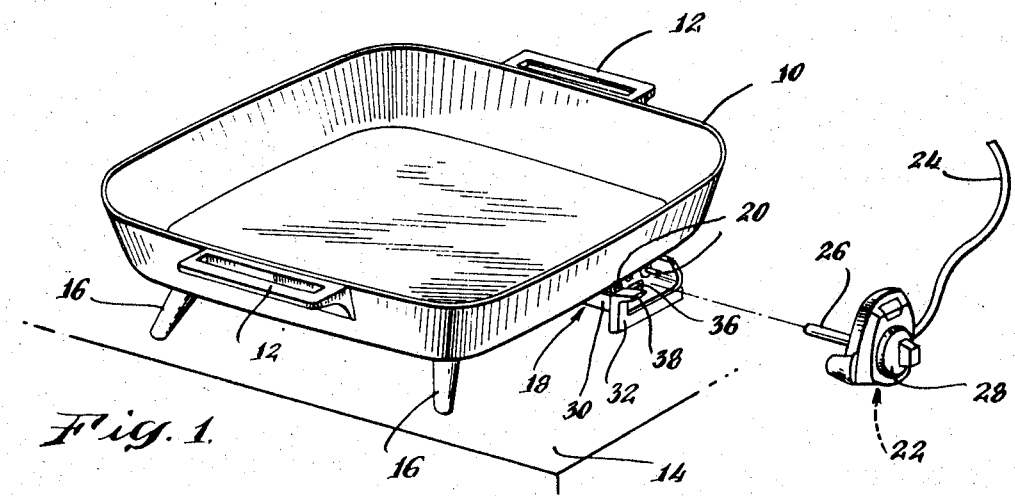
FIG. 1 is a perspective view of an electric cooking appliance showing the control member completely moved out of the terminal portion on the vessel.

Referring first to FIG. 1, there is shown an electric cooking appliance comprising a vessel 10 with a pair of handles 12 that may extend from any two opposite sides as shown. The vessel is supported from a surface 14 by suitable supporting legs 16 in the normal manner. In order to supply current there is provided, generally at one side and the bottom of the vessel, a terminal portion 18 that is made up in part of a pair of electric terminals 20 that are connected to interior heating elements within the vessel. These terminals 20 are insulated by known means so that the vessel 10 may be immersed in water for cleaning. It is thus necessary to protect the insulation between the terminals 20 and vessel 10 to maintain the integrity of the water-tight connection and a shield member is normally provided.

The correct temperature is maintained in the vessel by means of a removable control member 22 that may fit several appliances and, with matching connections for terminals 20, is the source of electric current through a side-connected cord 24. The temperature of the vessel is sensed by a sensing means such as a probe thermostat or finger 26 that extends or contacts the vessel normally between the terminals and automatically regulates the current to the vessel for proper heating as determined by setting temperature control knob 28. It can be seen that the finger 26 is considerably longer than terminals 20 and actually supports the control member 22 on the vessel 10 when member 22 has been moved away from the terminals 20.

It will be appreciated that the relatively high temperature operation of vessel 10 and the reduced size of control member 22 results in the user's hand being quite close to the hot vessel when it is desired to remove the control member 22. This is further aggravated when the handles 12 are on the sides away from the terminals as shown in FIG. 1 so that holding the handles and attempting to remove the control member 22 spaced therefrom results in difficulty and a tendency to move the vessel 10 around when applying the force necessary to remove control member 22 against the normal friction of terminals 20 which is increased due to expansion under temperature.

Figure 2:
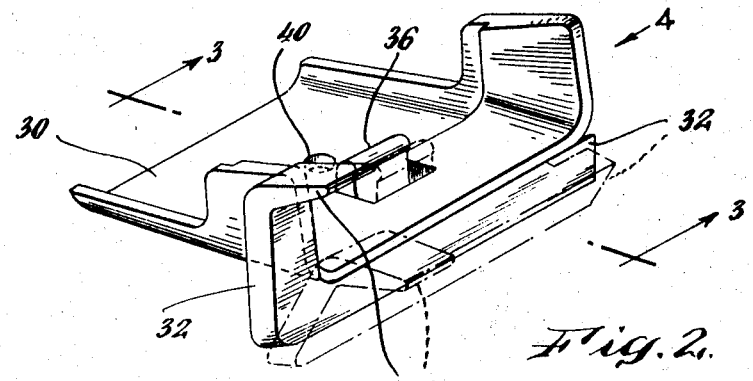
FIG. 2 is a perspective view of the improved shield member incorporating the ejector assembly showing the normal solid line position and the ejecting position in dotted lines.

To alleviate this condition, an ejector that forms part of the shield that normally surrounds terminals 20 to protect them from damage and to isolate the electric terminals from the user, is provided as shown in FIG. 2. A modified shield member 30 is formed, so that, with the vessel, it substantially surrounds terminals 20 on the cooking vessel in the usual way. For easy removal of the control, an ejector assembly is formed with and made a part of the shield member 30. This includes a lever means 32 that is pivoted to the shield at 34 opposite the connection of cord 24 so as not to interfere with the cord. The lever means 32 has an ejector in the form of a tab 36 on one end of the lever and the ejector tab is designed to fit between the control member 22 and the vessel 10 as seen in FIG. 3. For operation of the ejector assembly, the lever is provided with a finger portion 38 on the other end so that downward force on the finger portion 38 rotates the ejector assembly about pivot 34 on the shield and consequent rotation of the tab 36 to the dotted position of FIG. 2 and movement of the control member 22 away from vessel 10 in a horizontal direction. In order to provide stability to the whole ejector structure when used, the entire terminal portion including the modified shield shown in FIG. 2 is disposed between the vessel supporting legs 16 toward the center of gravity of the vessel as shown in FIG. 1. In this position, the downward force is then transmitted through legs 16 to the supporting surface 14 and the whole stability of the ejector assembly is increased.

Figure 4:
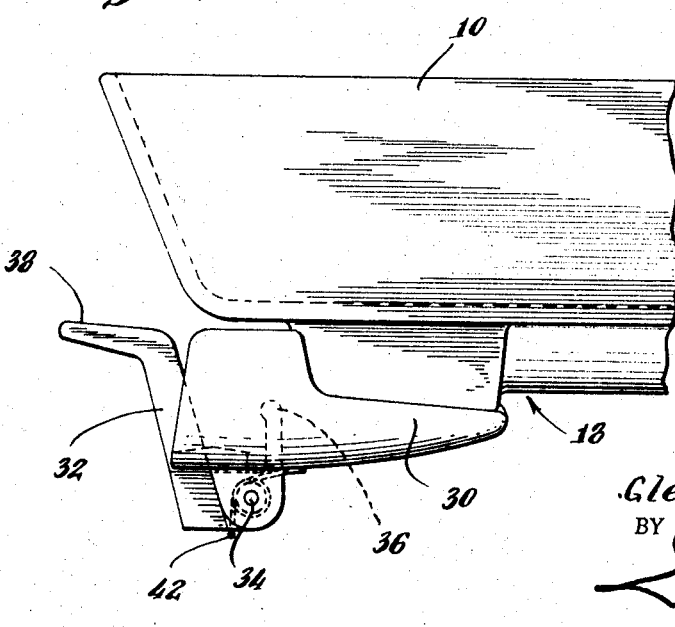
FIG. 4 is an end view looking in the direction of arrow 4 of FIG. 2.

Any sufficient movement of the control member 22 may be provided by the amount of rotation imparted to ejector tab 36 and the mecahnical advantage desired may be provided by the respective moment arms of tab 36 and finger 38 as will be apparent in FIGS. 3 and 4. It is generally desirable to provide sufficient force merely to break the tight friction fit and leave the control member 22 supported substantially on the longer finger 26 on the vessel 10. Thus, the parts are dimensioned merely to break the tight friction connection between the terminals 20 and the control member 22 and move the control member away from the vessel 10 whereby it is then supported on finger 26 on the control or vessel and may be easily lifted off the vessel.

In order to provide an even ejector force to break the grip of terminals 20, the ejector tab 36 is preferably disposed midway between the terminals 20 and directly below the probe finger 26 as will be apparent in FIG. 5. In this figure, fastening hole 40 takes a single screw to fasten the entire shield assembly to the cooking vessel 10.

In order to return the finger portion 38 to an upright position after the control member has been moved away from the vessel, a suitable biasing means, such as spring 42, may be provided in the pivot area between the pivot 34 and the lever arm 32 to spring the device back into the upright position of FIGS. 3 and 4.

It is to be noted that the vessel itself, supporting the terminal shield member 30, supplies the necessary stability for the operation of the ejector as well as the location between the legs 16 of the vessel. It will be seen that the entire modified shield member may be made of molded plastic. The addition of the ejector assembly of the lever means 32 and tab 36 may be easily molded to be attached to shield member 30 which may be slightly modified as described to handle the ejector assembly. With a small compact control member 22 and its tight fit to vessel 10, it will be seen that the addition of the ejector assembly provides an easy and inexpensive safety feature for removal of the control member 22 and that the ejector assembly forms part of the normal shield structure on the cooking vessel 10. The orientation of the parts is such that the vessel itself provides the stability necessary for the ejecting force to be transmitted to the supporting surface 14 and safely break the connection of control member 22 with the vessel 10 so that the control member may be easily removed and set aside.

While the preferred embodiment of the ejector assembly has been shown, it will be apparent that the individual parts, such as the preferred location of tab 36 and finger portion 38 opposite the cord 24 may be varied. It is preferred, as described, that the ejector assembly form part of the shield structure and be applied in a downward direction through the supporting legs for stability of the entire device. Thus, within the scope of the attached claims, the structure may be varied.

What is claimed is:

1. An electric cooking appliance with handle means thereon comprising, a vessel with an attached heating element connected to projecting electric terminals, a control member removably mounted on said vessel and spaced from said handle means and having a temperature sensing means and a connection to sid terminals, an enclosing shield member mounted on said vessel and substantially surrounding the terminals, lever means pivoted on said shield having an ejector on one end located between said control member and vessel at said terminals, biasing means between said lever and shield, said lever having a finger portion on the other end whereby downward force on the finger portion rotates said ejector to move said control member away from said vessel and said biasing means returns said lever to an upright position.

2. Apparatus as described in claim 1 wherein said sensing means is connected to said vessel between said terminals and said ejector comprises a tab located between said terminals.

3. Apparatus as described in claim 1 wherein said control has an electric cord connected to one side thereof and said finger portion is located on said shield opposite said cord.

4. Apparatus as described in claim 1 where said vessel has supporting legs thereon and said ejector is located between the legs toward the center of gravity of the vessel whereby the downward force is transmitted through said legs to the supporting surface for said vessel.

5. Apparatus as described in claim 2 wherein said sensing member comprises a probe with a finger longer than said terminals and the tab moves said control away from said vessel and terminals for support on the vessel substantially on said probe alone.

6. Apparatus as described in claim 5 wherein said tab is located midway between the terminals and directly below the probe finger for even force on the control member.

References Cited

UNITED STATES PATENTS 3,035,243  5/1962  Bowling.
3,095,498  6/1963  Foster _____ 219—441

BERNARD A. GILHEANY, *Primary Examiner.*

HIRAM B. GILSON, *Assistant Examiner.*

U.S. Cl. X.R.

339—45